US012537341B2

(12) United States Patent
Valentin et al.

(10) Patent No.: US 12,537,341 B2
(45) Date of Patent: Jan. 27, 2026

(54) LOCKING ELECTRICAL CONTACT DEVICE WITH SWITCH

(71) Applicant: Hubbell Incorporated, Shelton, CT (US)

(72) Inventors: William Ramon Valentin, Meridien, CT (US); Thomas Louis Scanzillo, Monroe, CT (US)

(73) Assignee: Hubbell Incorporated, Shelton, CT (US)

( * ) Notice: Subject to any disclaimer, the term of this patent is extended or adjusted under 35 U.S.C. 154(b) by 385 days.

(21) Appl. No.: 18/351,726

(22) Filed: Jul. 13, 2023

(65) Prior Publication Data

US 2023/0361506 A1 Nov. 9, 2023

Related U.S. Application Data

(63) Continuation of application No. 17/241,810, filed on Apr. 27, 2021, now Pat. No. 11,735,865, which is a (Continued)

(51) Int. Cl.
*H01R 13/00* (2006.01)
*H01R 13/10* (2006.01)
(Continued)

(52) U.S. Cl.
CPC ....... *H01R 13/62927* (2013.01); *H01R 13/10* (2013.01); *H01R 13/20* (2013.01); *H01R 13/71* (2013.01); *H01R 24/005* (2013.01)

(58) Field of Classification Search
CPC ........ H01R 13/10; H01R 13/20; H01R 13/71; H01R 24/005; H01R 13/6292
See application file for complete search history.

(56) References Cited

U.S. PATENT DOCUMENTS 3,176,259 A 3/1965 MacNamara
3,206,709 A 9/1965 De Vore
(Continued)

OTHER PUBLICATIONS

International Search Report and Written Opinion issued on Aug. 24, 2018, by the International Searching Authority in corresponding International Patent Application No. PCT/US2018/037329. (12 pages).

*Primary Examiner* — Phuong Chi Thi Nguyen
(74) *Attorney, Agent, or Firm* — Robinson + Cole LLP

(57) ABSTRACT

An electrical connector assembly includes a first electrical contact device and a second electrical contact device. The first electrical contact device includes a plurality of conductors. The second electrical contact device includes a first portion, a second portion movable in a rotational and translational manner relative to the first portion, and an actuator movable between a first position and a second position. The first portion includes first electrical contacts, and the second portion includes electrical sockets. Each socket receives an associated conductor and includes a second electrical contact aligned with an associated first electrical contact. The second portion is biased away from the first portion. When the actuator is in the first position, the actuator inhibits translational movement of the second portion toward the first portion. When the actuator is in the second position, the second portion is movable toward the first portion to permit the second electrical contacts to engage the first electrical contacts.

20 Claims, 19 Drawing Sheets

Related U.S. Application Data continuation of application No. 16/619,815, filed as application No. PCT/US2018/037329 on Jun. 13, 2018, now Pat. No. 11,018,451.

(60) Provisional application No. 62/518,825, filed on Jun. 13, 2017.

(51) Int. Cl.

| | |
|---|---|
| ***H01R 13/20*** | (2006.01) |
| ***H01R 13/629*** | (2006.01) |
| ***H01R 13/71*** | (2006.01) |
| ***H01R 24/00*** | (2011.01) |

(56) References Cited

U.S. PATENT DOCUMENTS

| | | | | |
|---|---|---|---|---|
| 4,140,358 | A | 2/1979 | Marechal | |
| 4,553,000 | A | 11/1985 | Appleton | |
| 4,678,254 | A | 7/1987 | Le Magourou | |
| 5,572,859 | A | 11/1996 | Derichs et al. | |
| 5,921,799 | A | 7/1999 | Forrester | |
| 6,302,726 | B1 | 10/2001 | Marechal | |
| 7,249,976 | B1 | 7/2007 | Watson | |
| 8,092,240 | B2 | 1/2012 | Houir Alami et al. | |
| 8,221,150 | B2 | 7/2012 | Houir Alami | |
| 8,979,591 | B2 | 3/2015 | Mehnert et al. | |
| 9,252,539 | B2 | 2/2016 | Condo et al. | |
| 9,819,127 | B2 | 11/2017 | Condo et al. | |
| 9,887,489 | B1 * | 2/2018 | Dietz | H01R 13/193 |
| 9,941,626 | B2 * | 4/2018 | Shendge | H01R 13/58 |
| 10,038,278 | B2 | 7/2018 | Lane et al. | |
| 10,498,074 | B2 | 12/2019 | Gibboney, Jr. | |
| 2014/0127926 | A1 | 5/2014 | Condo et al. | |
| 2022/0255264 | A1 | 8/2022 | Martin et al. | |
| 2023/0361506 | A1 * | 11/2023 | Valentin | H01R 24/005 |

* cited by examiner

LOCKING ELECTRICAL CONTACT DEVICE WITH SWITCH

CROSS-REFERENCE TO RELATED APPLICATION

This application is a continuation of prior-filed, co-pending U.S. patent application Ser. No. 17/241,810, filed Apr. 27, 2021, which is a continuation of U.S. patent application Ser. No. 16/619,815, filed Dec. 5, 2019, which is a national phase application of PCT Application No. PCT/US2018/037329, filed Jun. 13, 2018, which claims the benefit of U.S. Provisional Patent Application No. 62/518,825, filed Jun. 13, 2017. The entire contents of these applications are incorporated by reference herein.

BACKGROUND

The present disclosure relates to electrical contact devices, and particularly to locking style electrical contact devices.

Electrical and communication cable connections include a male connector and a female connector receiving the male connector. In some circumstances, a lock mechanism may secure the connectors and prevent disconnection.

SUMMARY

In one aspect, an electrical connector assembly includes a first electrical contact device and a second electrical contact device. The first electrical contact device includes a plurality of conductors. The second electrical contact device includes a first portion, a second portion movable in a rotational and translational manner relative to the first portion, and an actuator movable between a first position and a second position. The first portion includes a plurality of first electrical contacts. The second portion includes a plurality of electrical sockets. Each of the sockets receives an associated one of the conductors, and each of the sockets includes a second electrical contact aligned with an associated one of the first electrical contacts. The second portion is biased away from the first portion such that the second electrical contacts are biased away from the first electrical contacts. When the actuator is in the first position, the actuator inhibits translational movement of the second portion toward the first portion. When the actuator is in the second position, the second portion is movable toward the first portion to permit the second electrical contacts to engage the first electrical contacts.

In another aspect, an electrical contact device for an electrical connector assembly includes a first portion, a second portion movable in a rotational and translational manner relative to the first portion, and an actuator movable between a first position and a second position. The first portion includes a plurality of first electrical contacts. The second portion includes a plurality of second electrical contacts, each second electrical contact aligned with an associated one of the first electrical contacts. The second portion is biased away from the first portion in a first direction defining an axis, and the second portion is movable along the axis relative to the first portion between an extended position and a retracted position. The second electrical contacts are spaced apart from the first electrical contacts when the second portion is in the extended position, and the second electrical contacts engage the first electrical contacts when the second portion is in the retracted position. The actuator inhibits the second portion from moving to the retracted position when the actuator is in the first position, and the second portion is movable to the retracted position when the actuator is in the second portion.

In yet another aspect, a method for forming an electrical connection between a first electrical contact device and a second electrical contact device includes: inserting a portion of the first electrical contact device into the second electrical contact device in a direction oriented parallel to an axis; rotating the first electrical contact device about the axis such that the first electrical contact device rotates a first portion of the second electrical contact device relative to a second portion of the second electrical contact device; moving an actuator from a first position to a second position; and pushing the first portion toward the second portion in the direction parallel to the axis to cause at least one electrical contact in the first portion to engage at least one electrical contact in the second portion.

The above-described and other features and advantages of the present disclosure will be appreciated and understood by those skilled in the art from the following detailed description and drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
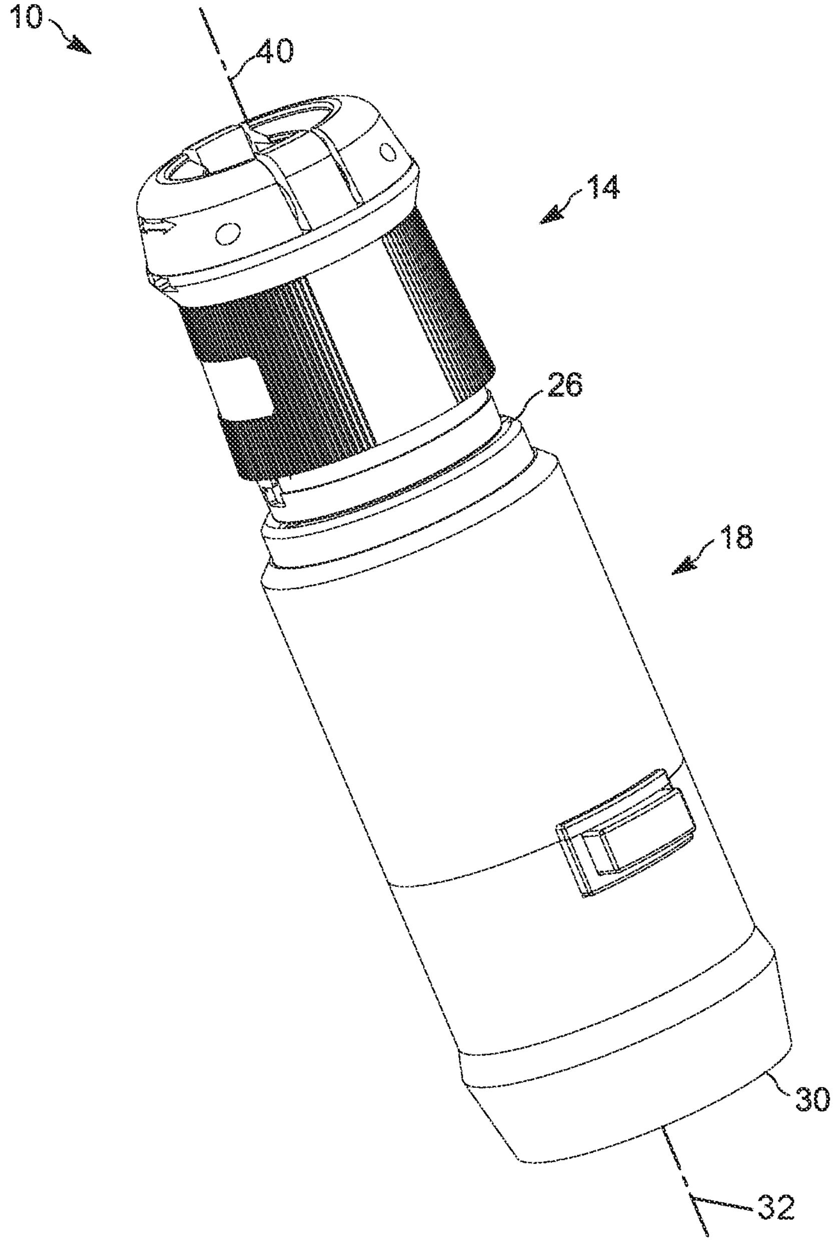
FIG. 1 is a perspective view of a connector assembly.
Figure 2:
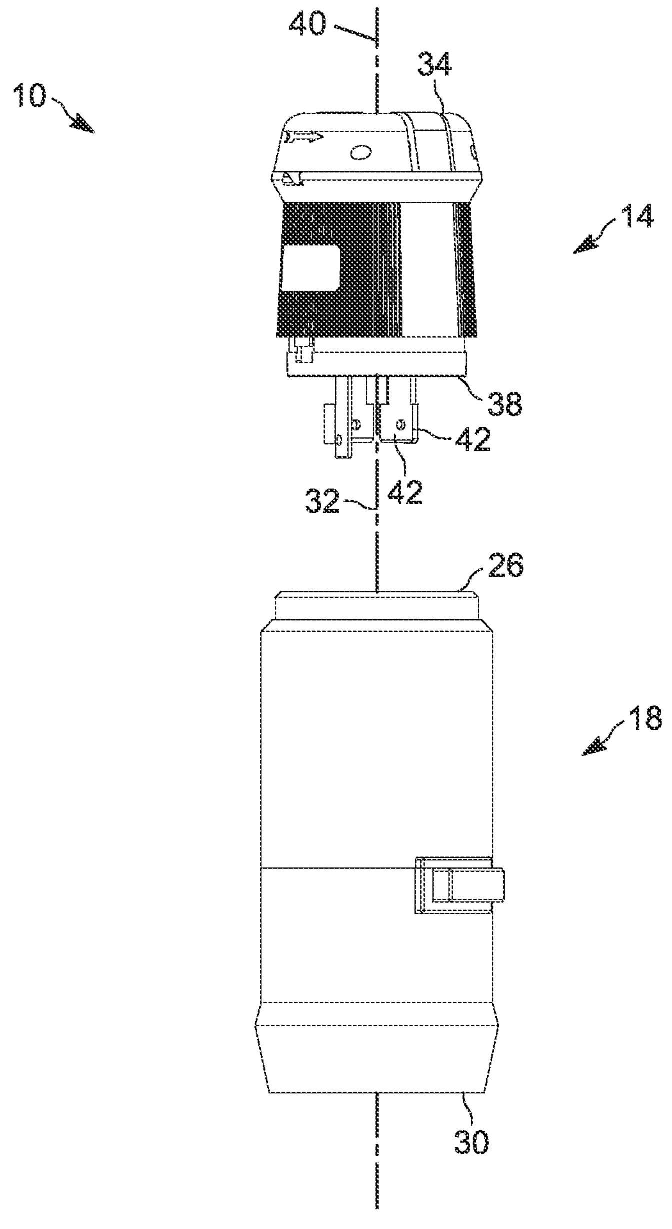
FIG. 2 is an exploded view of the connector assembly of FIG. 1.

FIGS. 1 and 2 show a connector assembly 10 including a first electrical contact device, e.g., a plug or male connector 14, and a second electrical contact device, e.g., a receptacle or female connector 18. As used herein, "electrical contact device" may refer to a device configured to be selectively coupled to another electrical contact device to provide electrical communication therebetween. Among other things, an electrical contact device may include a plug or a male electrical connector and a receptacle or female connector.

Figure 3:
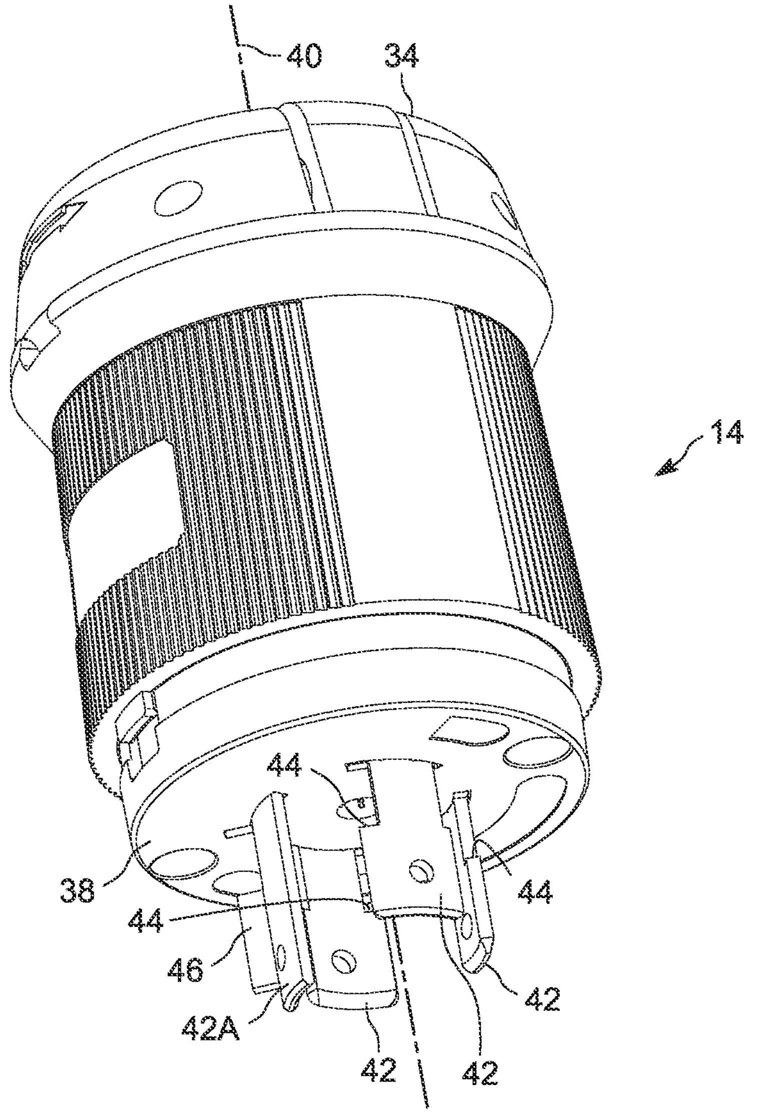
FIG. 3 is a perspective view of a male connector.

In the illustrated embodiment, the female connector 18 includes a first end 26 and a second end 30, and defines a longitudinal axis 32 extending therebetween. The second end 30 may receive an electrical conductor or cable (not shown) As shown in FIG. 3, the male connector 14 includes a first end 34 and a second end 38, and defines a longitudinal axis 40 extending therebetween. The first end 34 may receive an electrical conductor or cable (not shown). The male connector 14 includes a plurality of conductors or blades or prongs 42 protruding from the second end 38 in a direction substantially parallel to the axis 40, and the prongs 42 are removably received in slots 58 (FIG. 4) positioned in the first end 26 of the female connector 18. In the illustrated embodiment, the male connector 14 includes four prongs 42, and the prongs 42 have an arcuate shape such that the prongs 42 define a circular or round profile. Each prong 42 includes a canard 44 extending laterally from one or both sides of the prong 42. In addition, one of the prongs **42*a* includes a locator tab 46 for insuring proper alignment of the prongs 42 with the female connector 18. In other embodiments, the male connector 14** may include fewer or more prongs and/or the prongs may have a different shape and/or configuration.

Figure 4:
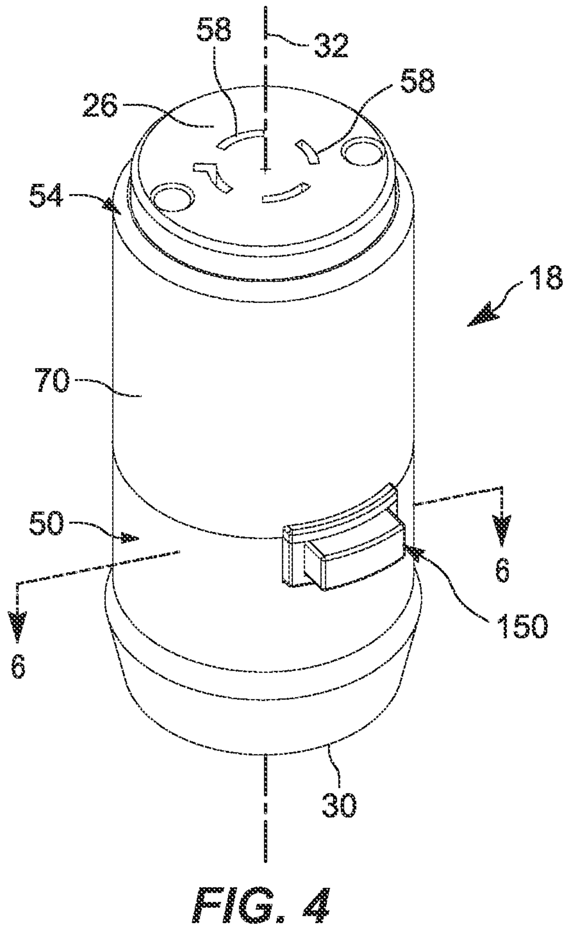
FIG. 4 is a perspective view of a female connector.

As shown in FIG. 4, the female connector 18 includes a first portion or base portion 50 and a second portion or socket portion 54. The socket portion 54 includes a plurality of slots 58, and the socket portion 54 forms the first end 26. In the illustrated embodiment, the socket portion 54 includes a slot 58 for each of the prongs 42 (FIG. 3) of the male connector 14, and the slots 58 have a shape and profile accommodating the shape and profile of the prongs 42. Sockets 62 (FIG. 5) are positioned adjacent each of the slots 58, and each socket 62 receives one of the prongs 42 when the prongs 42 are inserted through the slots 58. Accordingly, in the illustrated embodiment, the female connector 18 includes four sockets 62 spaced apart from one another about the axis 32.

Figure 5:
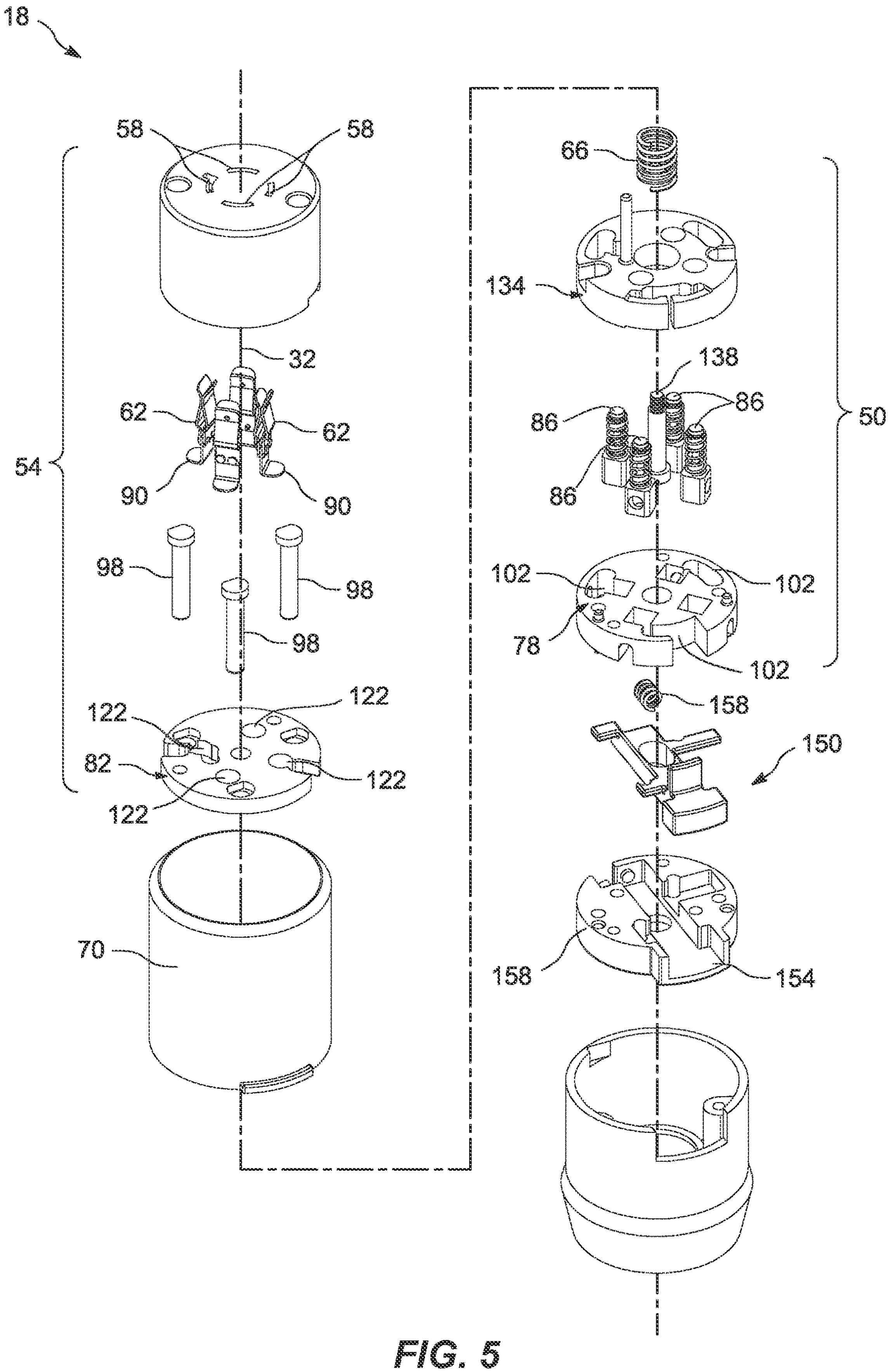
FIG. 5 is an exploded view of the female connector of FIG. 4.

As shown in FIG. 5, the socket portion 54 of the female connector 18 is biased away from the base portion 50 (e.g., by a main spring 66). The socket portion 54 may be supported within a housing 70. The base portion 50 includes a first plate or first support member 78, and the socket portion 54 further includes a second plate or second support member 82. The base portion 50 also includes first electrical contacts or base contacts 86, while each socket 62 of the socket portion 54 includes a second electrical contact or socket contact 90. Each socket contact 90 is axially aligned with an associated one of the base contacts 86. Each socket contact 90 and the associated base contact 86 are radially spaced apart from the axis 32 by a radial distance.

Also, a plurality of pins 98 extends between the first support member 78 and the second support member 82. In the illustrated embodiment, the pins 98 are secured to the socket portion 54 and are movable relative to the base portion 50. Each pin 98 is aligned with an opening 102 in the first support member 78. The openings 102 may have an arcuate profile to permit movement of the pins 98 about the axis 32.

In the illustrated embodiment, the socket portion 54 and the socket contacts 90 are positioned on one side of the second support member 82, and the pins 98 extend through the second support member 82. The female connector 18 includes three pins 98 oriented parallel to the longitudinal axis 32 and spaced apart from one another about the axis 32, and the pins 98 are radially spaced apart from the axis 32 by a larger radial distance than the radial distance of the socket contacts 90. In other embodiments, the female connector 18 may include fewer or more pins 98, and/or the pins may be positioned in a different manner. In addition, each pin 98 may include a first end or head end 110 (FIG. 9) abutting the second support member 82. The pins 98 extend through the second support member 82, and a second end or foot end 114 (FIG. 9) is positioned adjacent the first support member 78. Each foot end 114 includes a detent or projection 118.

Figure 9:
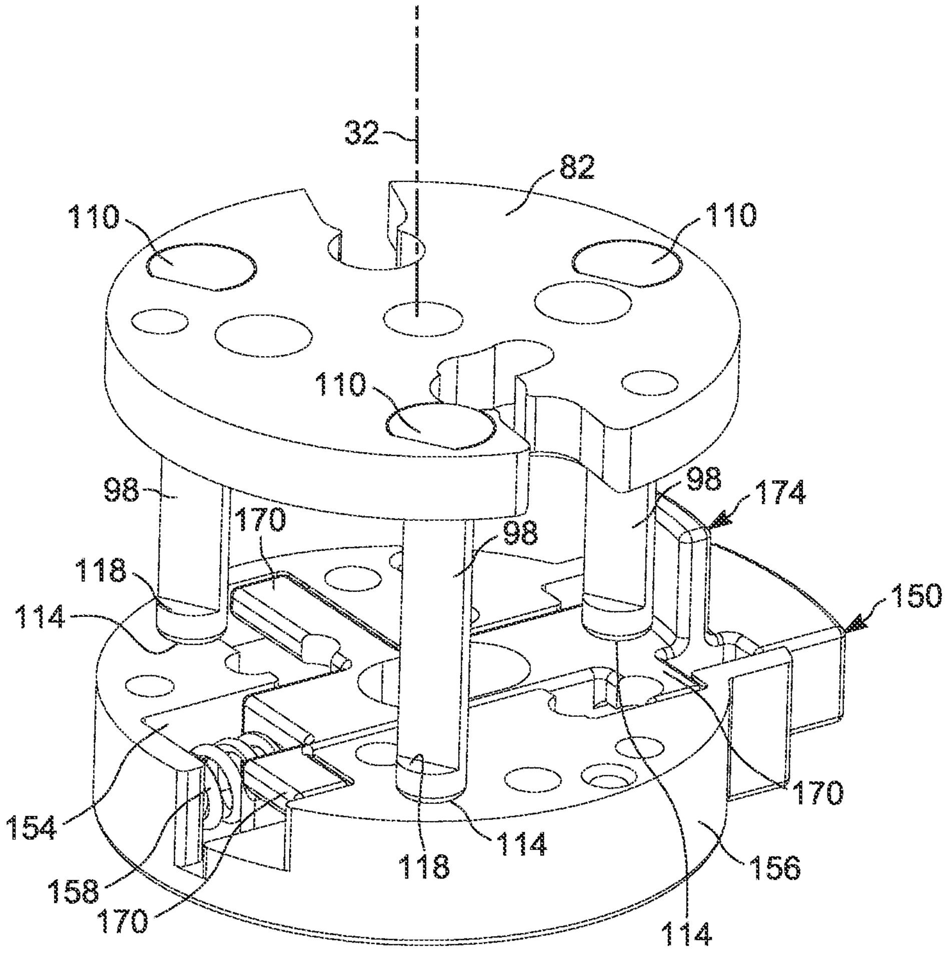
FIG. 9 is a perspective view of a portion of the female connector of FIG. 8.
Figure 10:
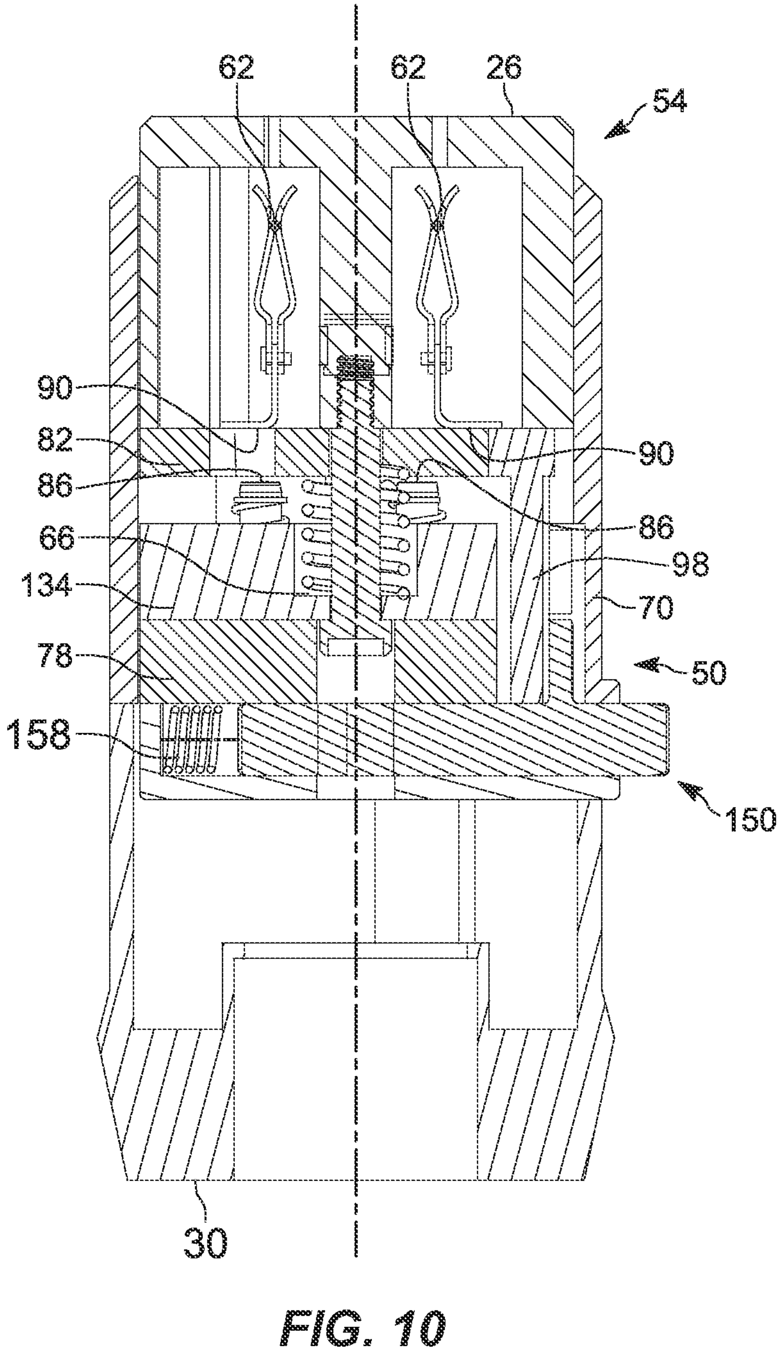
FIG. 10 is a section view of the female connector of FIG. 8, viewed along section 10-10.
Figure 11:
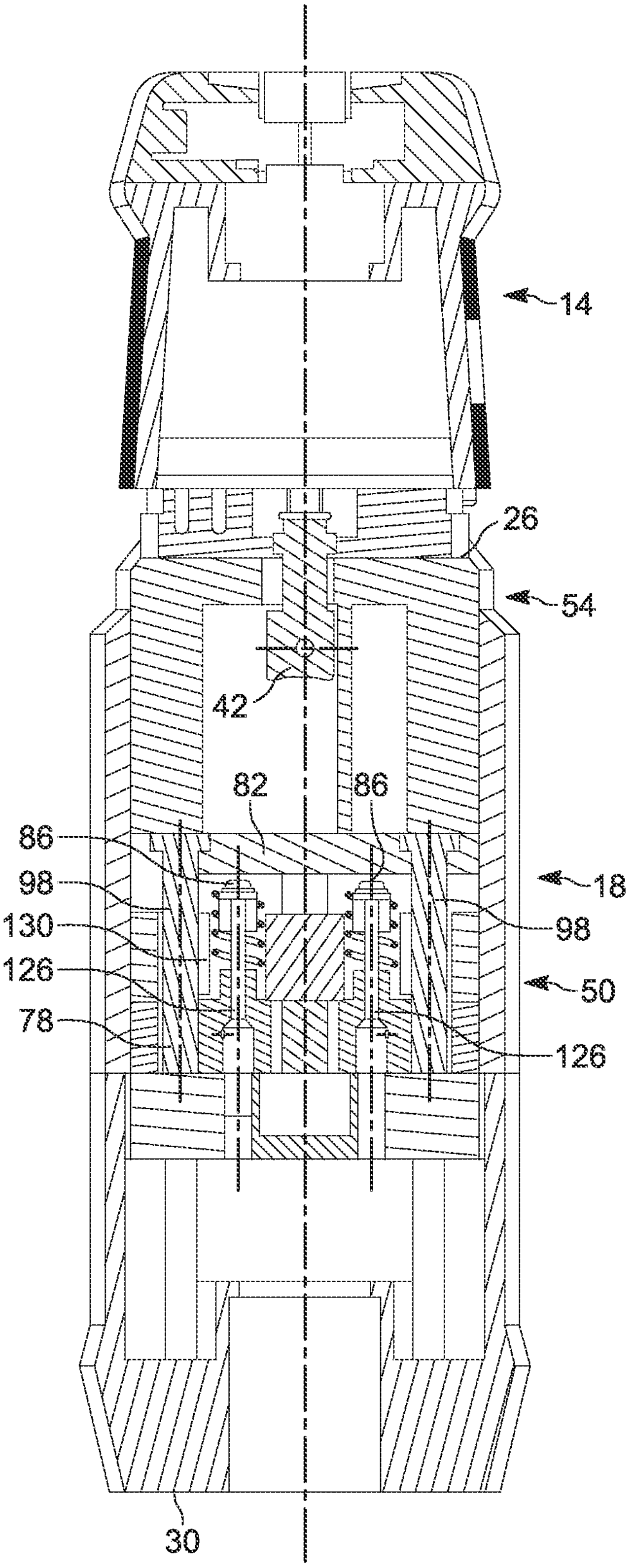
FIG. 11 is a section view of the female connector of FIG. 8, viewed along section 11-11 and coupled to the male connector of FIG. 3.

The base contacts 86 are coupled to the first support member 78 and extend toward the second support member 82. Each of the base contacts 86 is aligned with an associated hole 122 in the second support member 82, and the base contacts 86 are spaced apart from one another about the axis 32. As shown in FIG. 9, while the second support member 82 is positioned away from the first support member 78 (for example, due to the biasing force of the spring 66—FIG. 5), the base contacts 86 do not extend through the second support member 82 and are therefore spaced apart from the socket contacts 90. When the socket portion 54 is moved axially toward the base portion 50, the socket contacts 90 engage the base contacts 86. As shown in FIG. 10, in the illustrated embodiment, each of the base contacts 86 is positioned on an end surface of a post 126 surrounded by a spring 130.

Referring again to FIG. 5, in the illustrated embodiment, a third plate or support member 134 is positioned between the first support member 78 and the second support member 82. The third support member 134 may assist in maintaining the alignment of the pins 98 and the base contacts 86. In addition, a support post 138 may extend through the main spring 66 to maintain alignment of the main spring 66.

Figure 6:
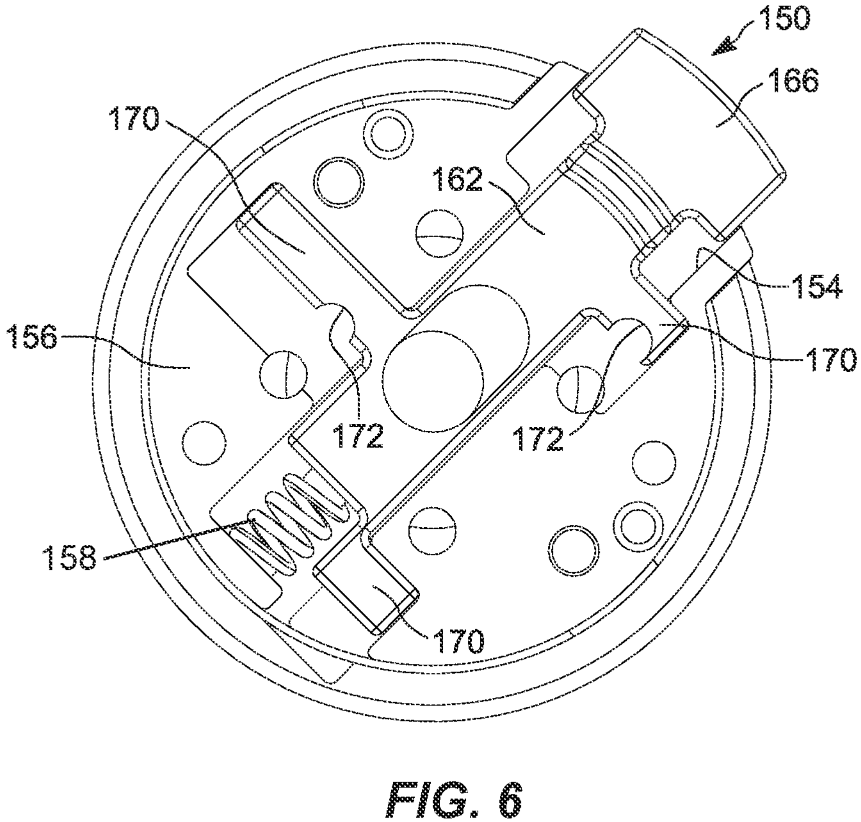
FIG. 6 is a section view of the female connector of FIG. 4, viewed along section 6-6.
Figure 7:
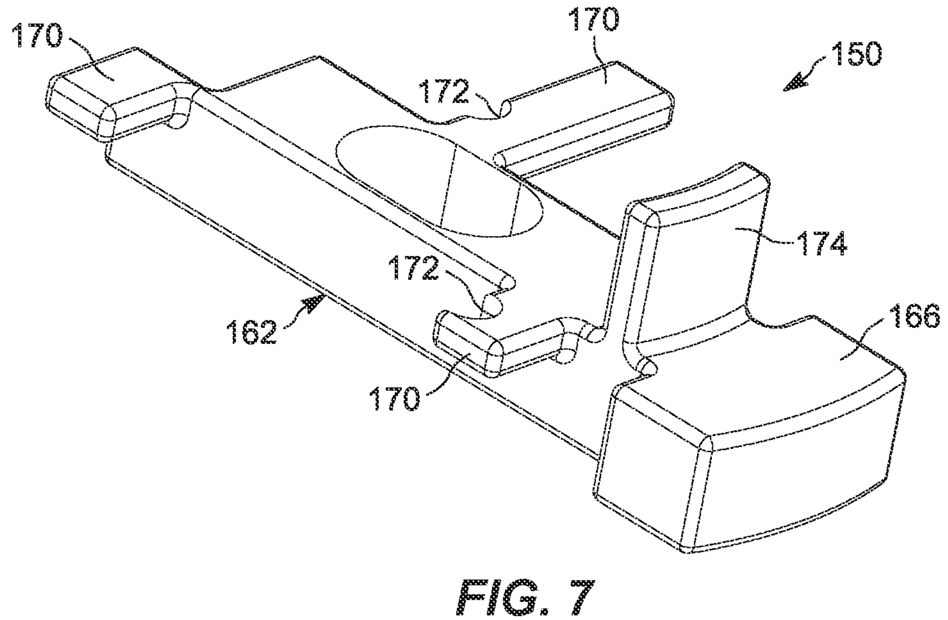
FIG. 7 is a perspective view of an actuator.
Figure 8:
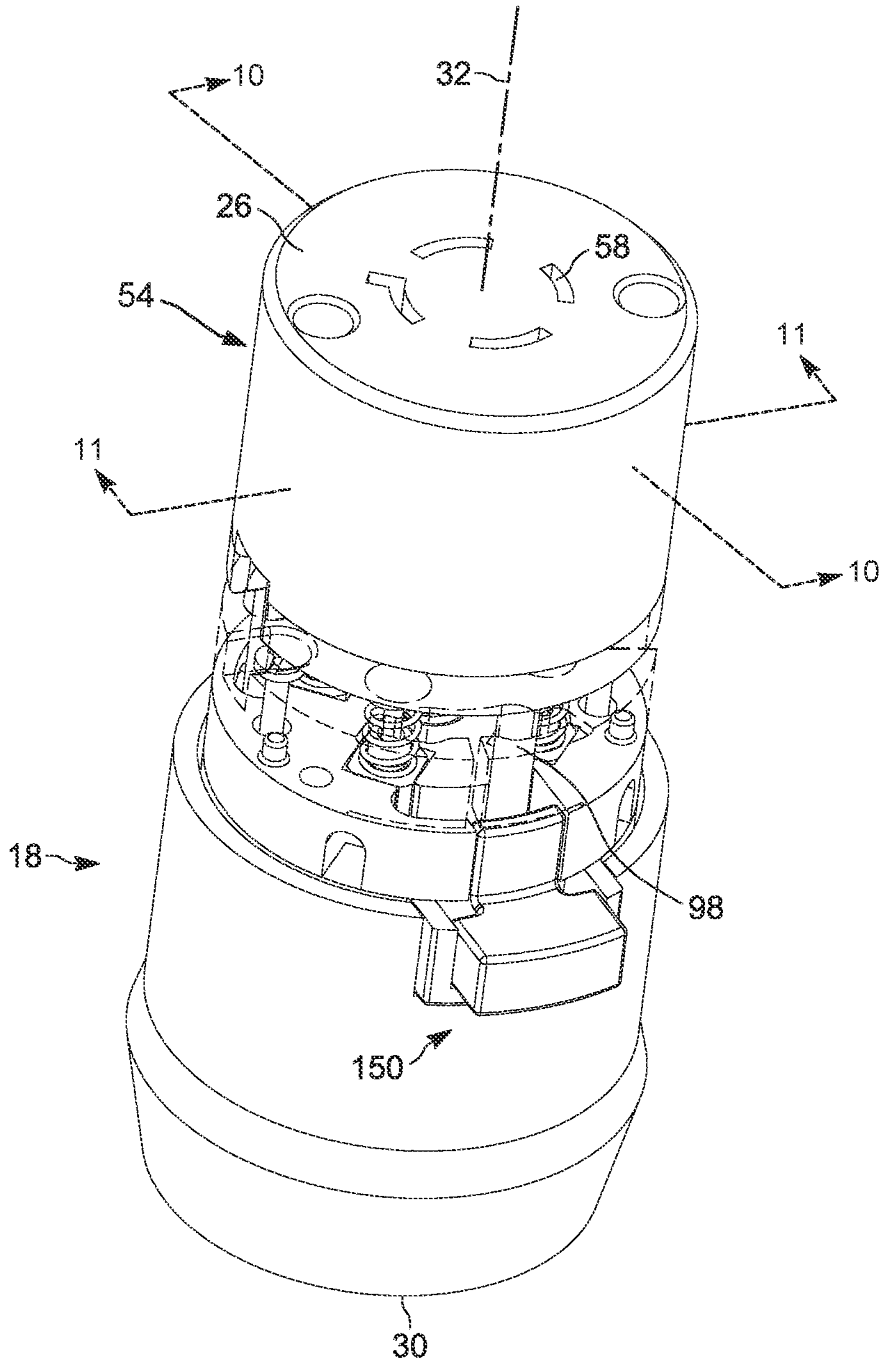
FIG. 8 is a perspective view of the female connector of FIG. 4 with a second portion in a first rotational position and an actuator in a first position.

As shown in FIGS. 5-7, the female connector 18 further includes an actuator or button 150 extending transversely relative to the longitudinal axis 32. In the illustrated embodiment, the button 150 is substantially positioned on an opposite side of the first support member 78 (FIG. 5) from the second support member 82. Stated another way, the first support member 78 is positioned axially between the second support member 82 and the button 150. As shown in FIG. 6, the button 150 is movable within a slot 154 of a carrier 156, and the button 150 is biased (e.g., by a button spring 158) toward a radially outward position. As shown in FIGS. 6 and 7, the button 150 includes a body portion 162 and a user-engaging portion 166 configured to protrude from the housing 70 of the female connector 18. The button 150 further includes protrusions 170 extending laterally from the body portion 162 (e.g., in a direction perpendicular to the longitudinal axis 32). At least some of the protrusions 170 include cutouts 172 (e.g., for accommodating conductor wiring). In the illustrated embodiment, the button 150 also includes a flange 174 (FIG. 7) projecting toward the socket portion 54 (e.g., in a direction parallel to the longitudinal axis 32).

FIGS. 8-11 illustrate a first state or default state of the female connector 18. The socket portion 54 is positioned in a first orientation or first rotational position with respect to the longitudinal axis 32. As shown in FIG. 10, the socket contacts 90 are axially spaced apart from the base contacts 86. The button 150 is in an extended position, and one or more of the pins 98 prevent the button 150 from being pressed into the housing 70. As shown in FIGS. 9 and 10, one of the pins 98 is positioned adjacent the flange 174, preventing the button 150 from being pressed. In addition, as shown in FIG. 9, the pins 98 are blocked from movement in the axial direction. In the illustrated embodiment, the foot ends 114 of the pins 98 abut the button 150 or the button carrier 156, thereby blocking axial movement of the pins 98 and preventing the second support member 82 from being moved axially toward the first support member 78 against the bias of the main spring 66. Consequently, if the prongs 42 of the male connector 14 are inserted through the slots 50 and into the sockets 62 in this state, the socket contacts 90 and the base contacts 86 remain separated such that no current flows between the male connector 14 and female connector 18.

Figure 12:
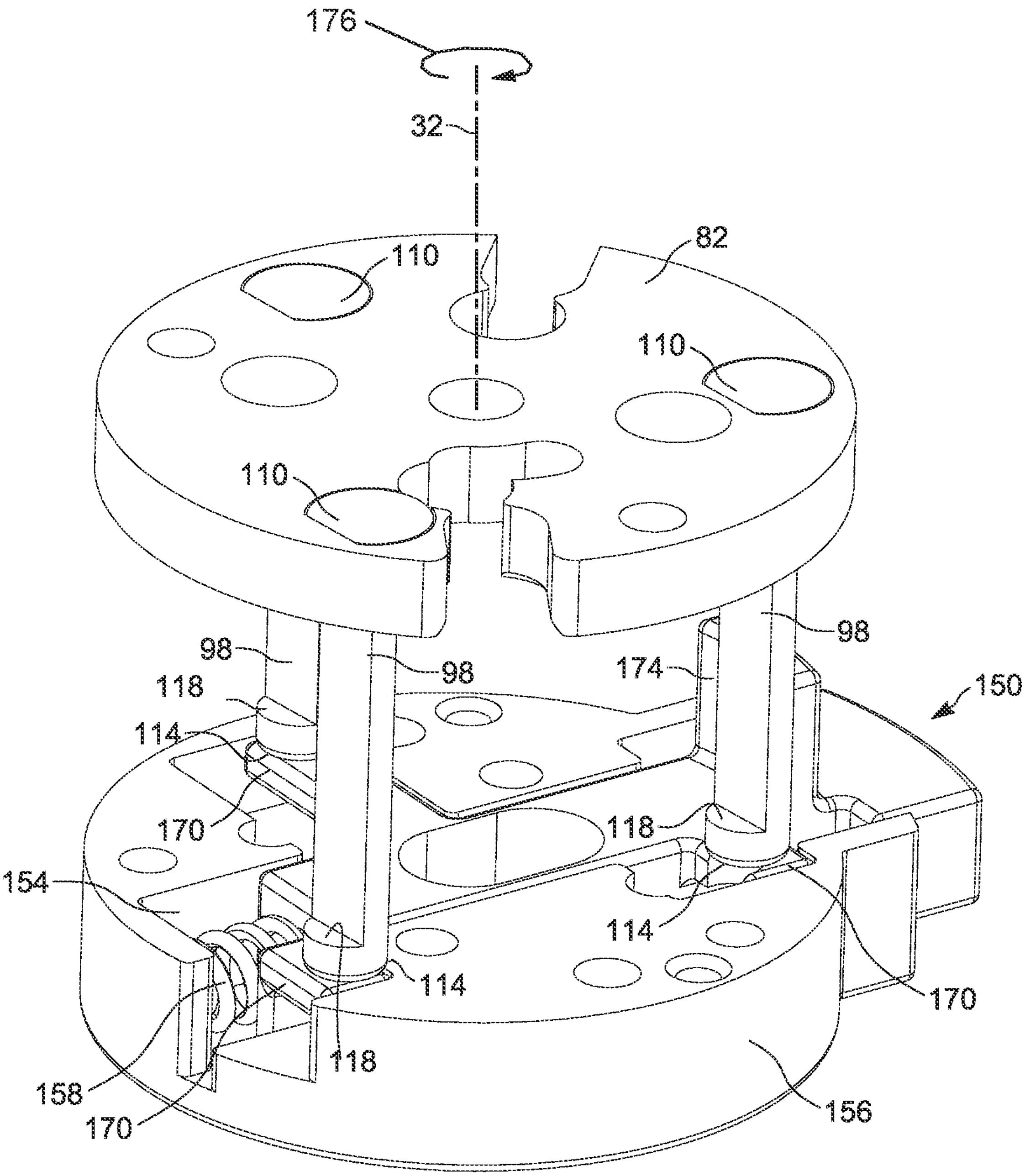
FIG. 12 is a perspective view of a portion of the female connector of FIG. 8 in a second rotational position and the actuator in the first position.
Figure 13:
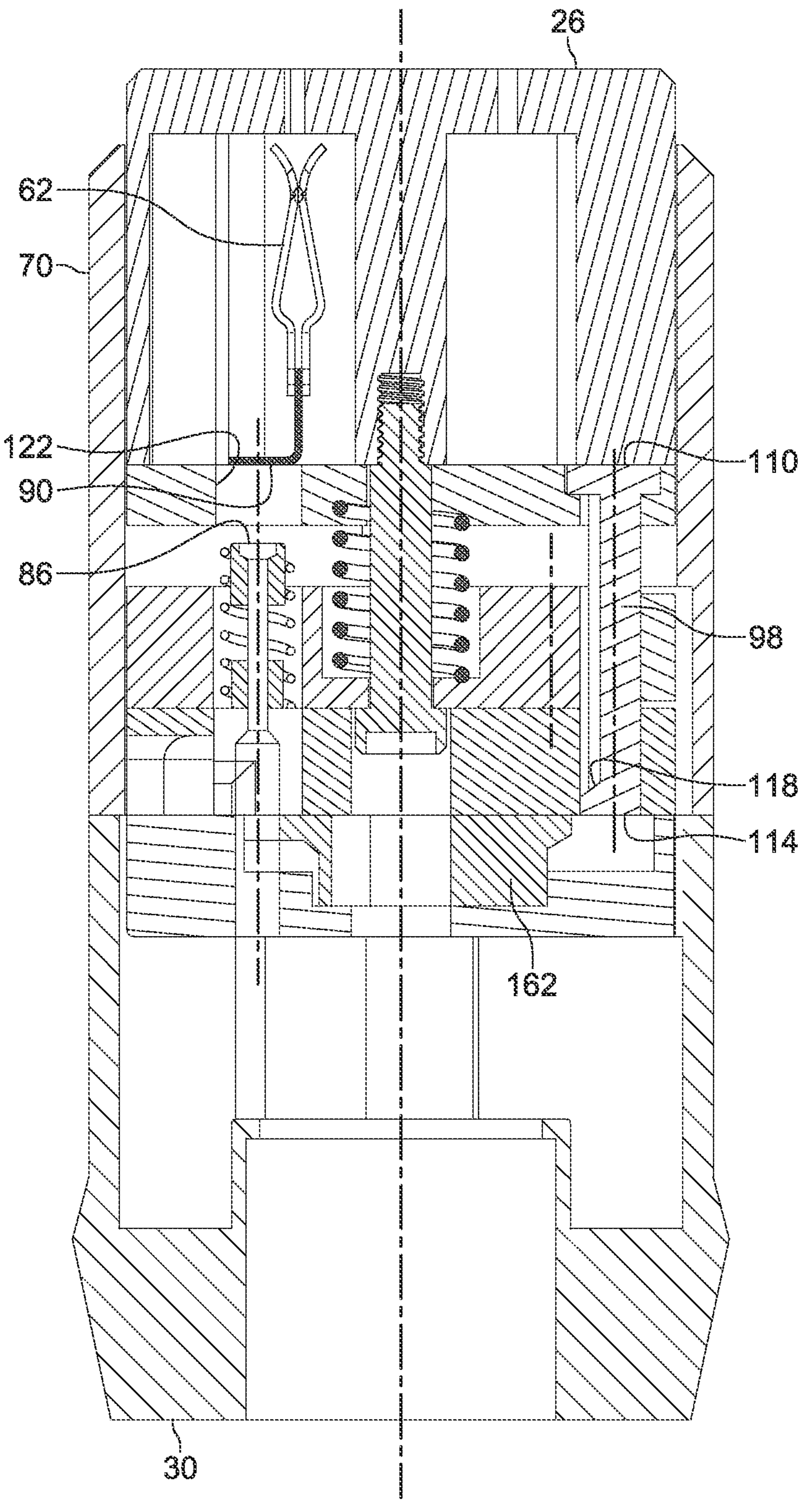
FIG. 13 is a section view of the female connector of FIG. 12, viewed along section 13-13 (as indicated in FIG. 15).
Figure 14:
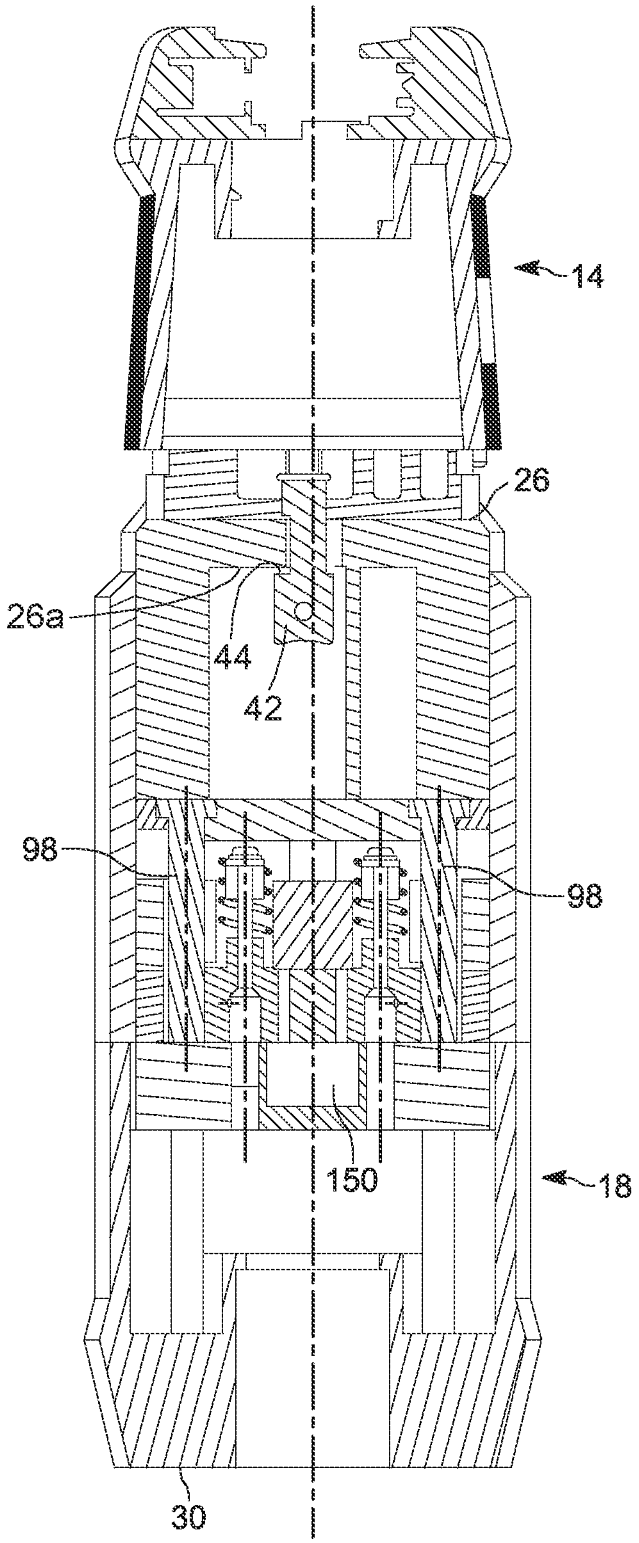
FIG. 14 is a section view of the female connector of FIG. 12, viewed along section 14-14 (as indicated in FIG. 15) and coupled to the male connector of FIG. 3.

FIGS. 12-14 illustrate a second state of the female connector 18 in which the socket portion 54 has been rotated to a second rotational position or second orientation about the longitudinal axis 32. To achieve this position, the male connector 14, with the prongs 42 (FIG. 14) positioned in the slots 50 of the female connector 18, is rotated about the longitudinal axis 32, thereby rotating the socket portion 54 of the female connector 18. The prongs 42 are positioned such that the canards 44 are positioned against an inner surface 26*a* of the first end 26, thereby securing the prongs 42 from being removed from the slots 50. In some embodiments, the prongs 42 may click into engagement with the first end 26. As best shown in FIG. 12, the rotation (e.g., in the direction of arrow 176) moves the pins 98 into alignment with the protrusions 170 of the button 150. The protrusions 170 therefore block axial movement of the pins 98 while the button 150 is in an extended position.

Figure 15:
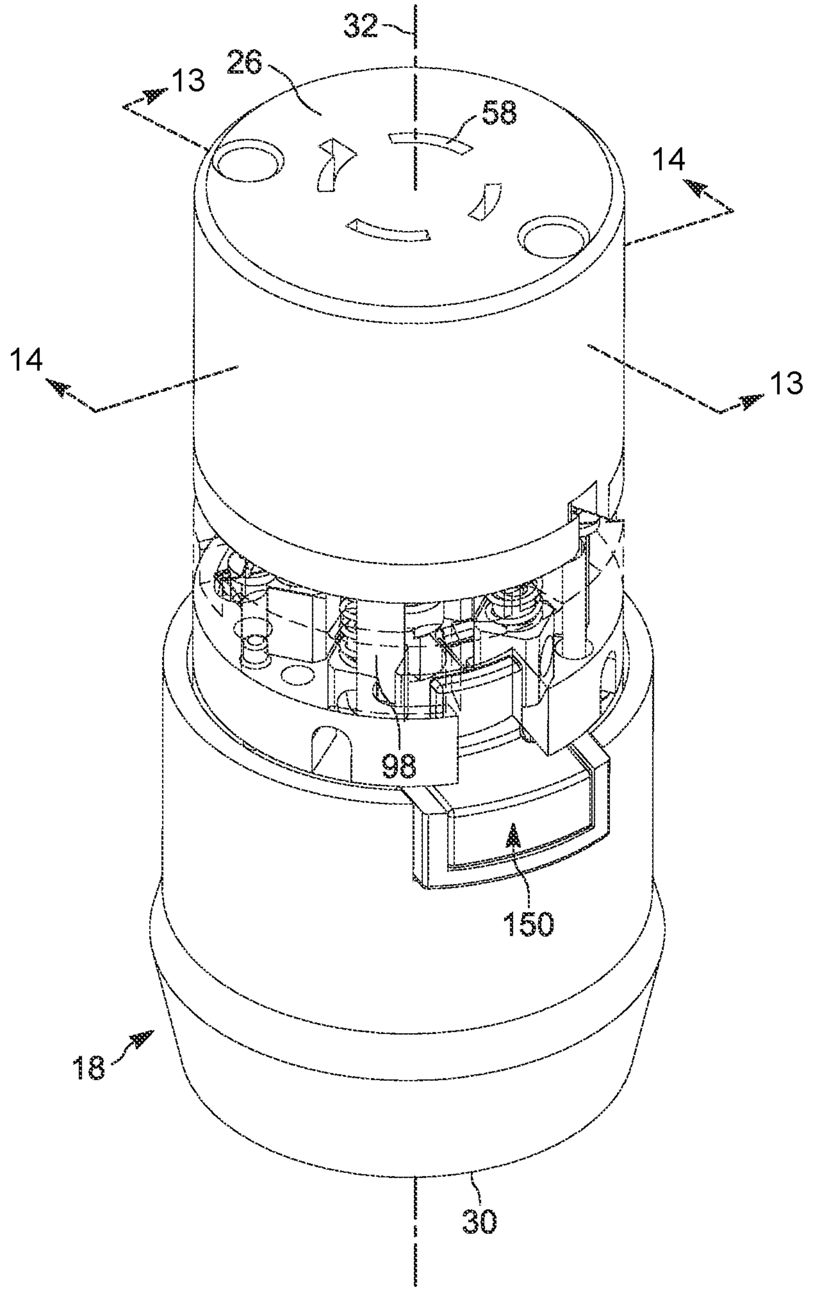
FIG. 15 is a perspective view of the female connector of FIG. 4 with the second portion in a second rotational position and the actuator in a second position.
Figure 16:
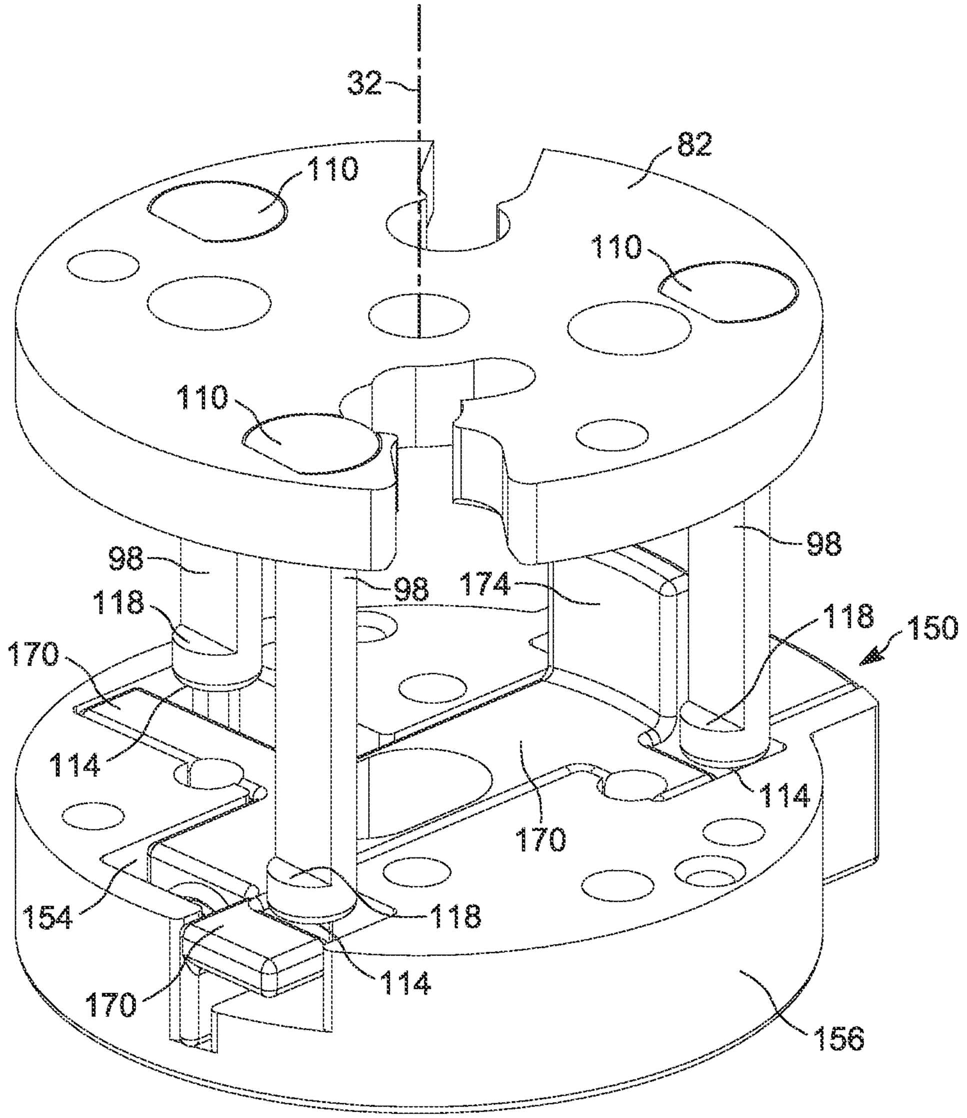
FIG. 16 is a perspective view of a portion of the female connector of FIG. 15.
Figure 17:
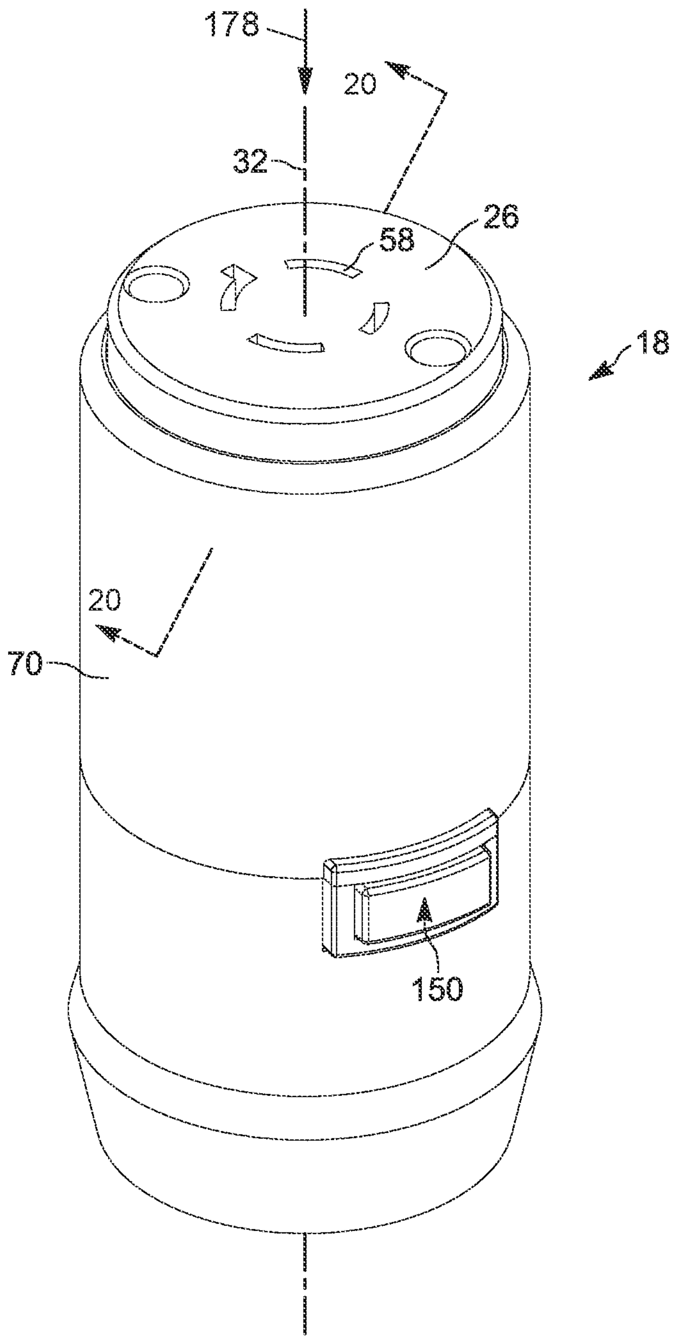
FIG. 17 is a perspective view of the female connector of FIG. 15, with a socket portion in a retracted position.

The rotation of the socket portion 54, however, causes the pin(s) 98 to move out of the path of the button 150 (e.g., to move out of the path of the flange 174). As shown in FIGS. 15 and 16, the movement of the pins 98 permits the button 150 to be pushed relative to the housing 70 against the bias of the button spring 158. As shown in FIG. 16, pushing the button 150 moves the protrusions 170, thereby opening an axial pathway for each of the pins 98 and permitting the pins 98 to move in a direction parallel to the longitudinal axis 32.

Figure 18:
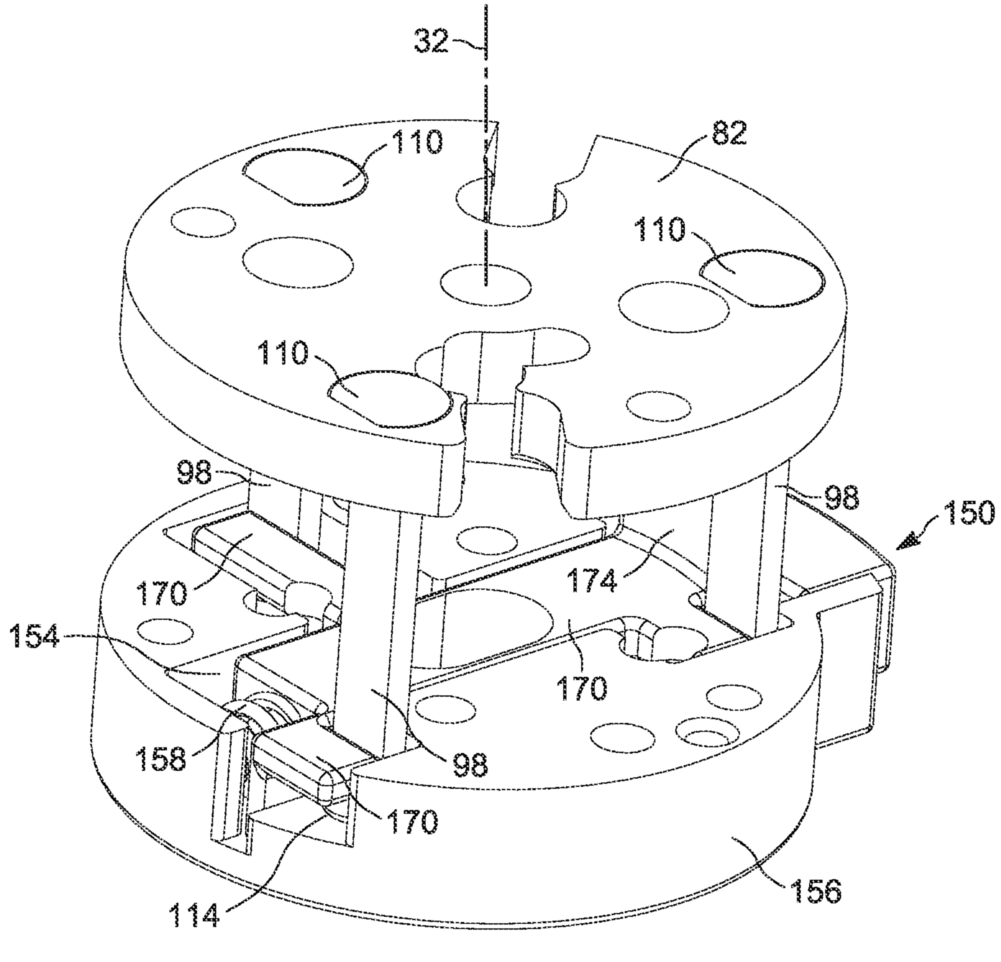
FIG. 18 is a perspective view of a portion of the female connector of FIG. 17.
Figure 19:
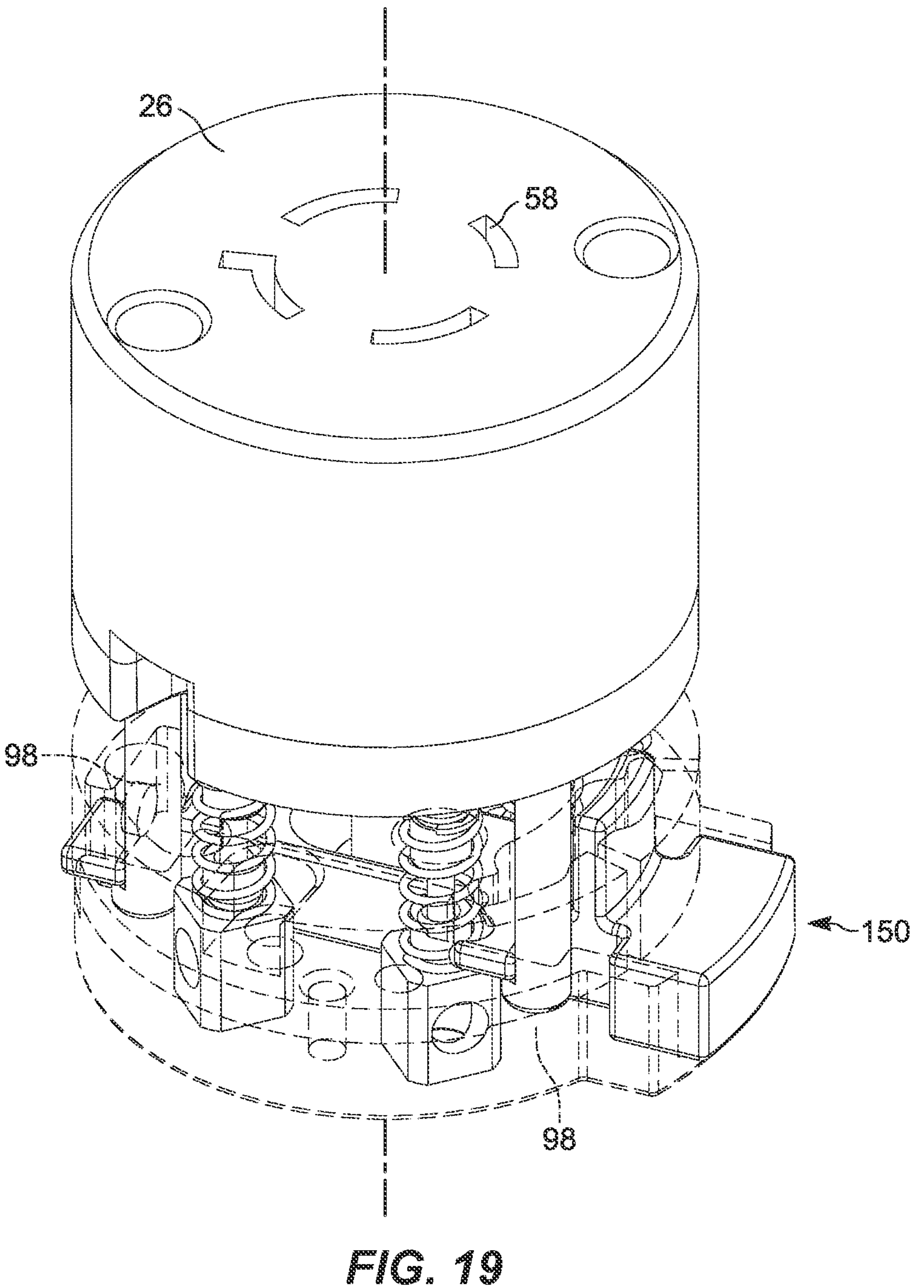
FIG. 19 is a perspective view of a portion of the female connector of FIG. 17.
Figure 20:
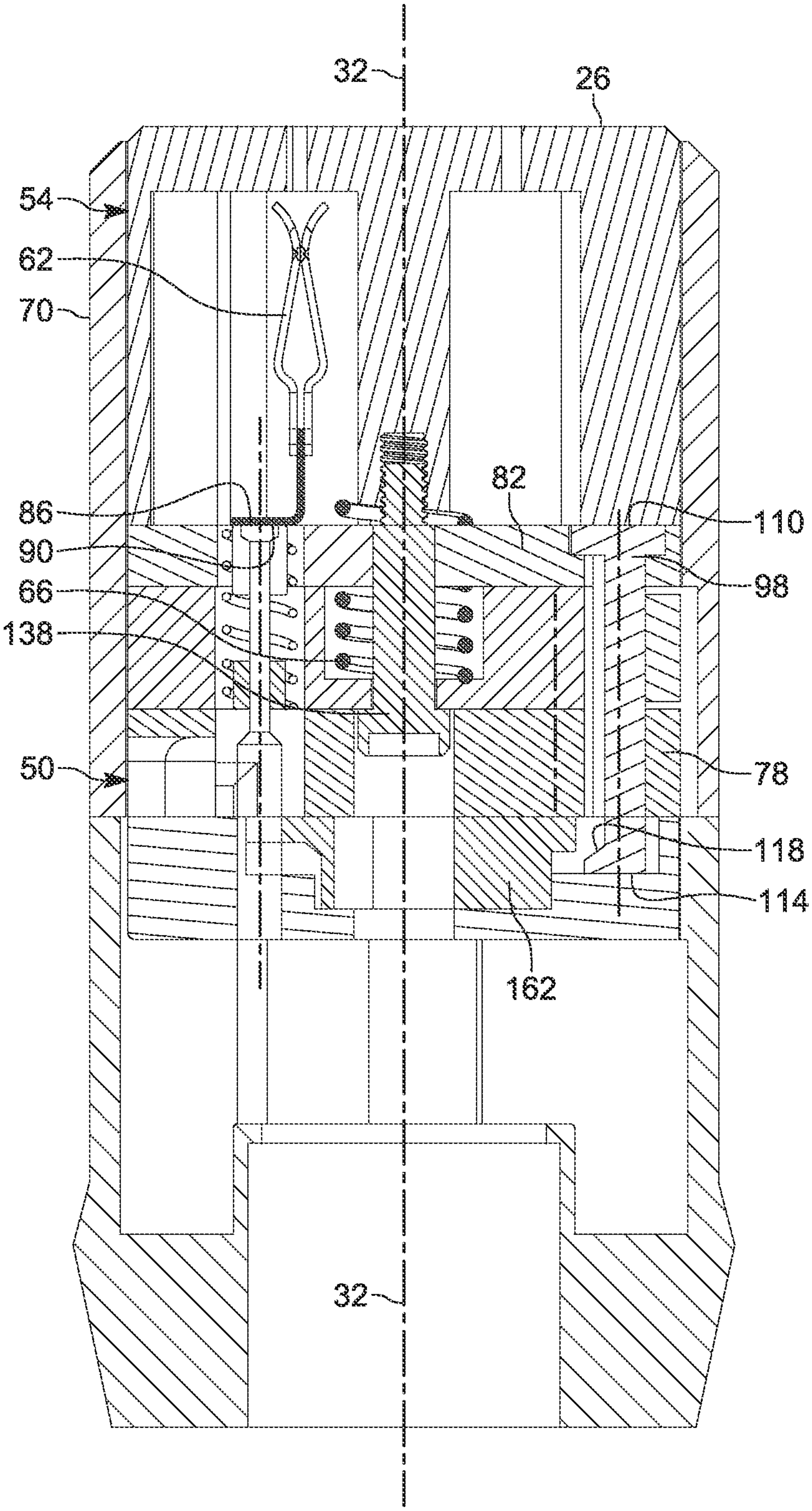
FIG. 20 is a section view of the female connector of FIG. 17, viewed along section 20-20.

Referring now to FIGS. 17-20, the socket portion 54 may be moved axially toward the base portion 50 (e.g., by applying pressure to the first end 26 in the direction 178 via the male connector 14) to a retracted position. As shown in FIGS. 18 and 19, the foot ends 114 of the pins 98 are moved past the protrusions 170. As a result, the socket contacts 90 (FIG. 20) engage the base contacts 86, forming an electrical connection and permitting current flow between the male connector 14 and the female connector 18. In addition, as shown in FIGS. 18 and 20, the projection 118 on the foot end 114 of each pin 98 engages one of the protrusions 170, thereby retaining the pins 98 and preventing the socket portion 54 from moving back to the extended position under the bias of the main spring 66. The engagement between the pins 98 and the button 150 therefore maintains engagement between the socket contacts 90 and the base contacts 86.

To break or open the connection, the button 150 is pressed again, disengaging the foot ends 114 of the pins 98 from the protrusions 170 and permitting the second support member 82 and socket portion 54 to move away from the first support member 78 and base portion 50, thereby disconnecting the socket contacts 90 from the base contacts 86. Then, the socket portion 54 may be rotated (e.g., by twisting the male connector 14) in an opposite direction about the longitudinal axis 32 to disengage the prongs 42 from the inner surface 26*a*. The prongs 42 may then be removed from the slots 50.

Unlike typical locking connectors in which the electrical contacts are immediately energized upon insertion of a plug into a socket, the connector assembly 10 includes a staged switching mechanism to interrupt current flow and maintain the electrical contacts in a non-energized state upon insertion of the male connector 14 into the female connector 18. The button 150 provides an additional switch that must be actuated to energize the contacts 86, 90, an action that is separate from insertion of the male connector 14. Similarly, the male connector 14 is withdrawn from the female connector 18 after the circuit is broken and the contacts 86, 90 are not energized. As a result, the insertion and withdrawal of the male connector 14 occurs while the electrical contacts 86, 90 are not energized, providing a safer connection for the user.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. An electrical connector assembly comprising:
- a first electrical contact device;
- a second electrical contact device selectively connected to the first electrical contact device along a connection axis, the second electrical contact device including a first portion and a second portion movable between a first device position and a second device position relative to the first portion, the second electrical contact device including at least one pin; and
- an actuator movable along an actuator axis between a first actuator position and a second actuator position, the actuator including,
  - a body extending along the actuator axis, and
  - at least one projection extending from the body in a first direction away from the actuator axis;
- wherein, in the first actuator position, the at least one projection is configured to support the at least one pin in the first device position and limit movement of the second portion in at least one direction; and
- wherein, in the second actuator position, the at least one projection is configured to be spaced apart from the at least one pin in the second device position and permit movement of the second portion in the at least one direction.

2. The electrical connector assembly of claim 1, wherein the second portion is biased away from the first portion in a first direction defining a longitudinal axis, and wherein the second portion is rotatable about the longitudinal axis between a first rotational position and a second rotational position.

3. The electrical connector assembly of claim 1, wherein:
first portion and the second portion are rotatable and translatable relative to one another;
in the first actuator position, the at least one projection is configured to limit translational movement along a movement axis perpendicular to the actuator axis and permit rotational movement about the movement axis; and
in the second actuator position, the at least one projection is configured to permit translational movement along a movement axis perpendicular to the actuator axis and permit rotational movement about the movement axis.

4. The electrical connector assembly of claim 1, wherein:
the actuator further includes a flange extending from the body in a second direction away from the actuator axis;
the second portion is rotatable relative to the first portion between a first pin position and a second pin position;
in the first pin position, the at least one pin is position adjacent to the flange and is configured to prevent movement of the actuator from the first actuator position to the second actuator position; and
in the second pin position, the at least one pin is spaced apart from the flange and is configured to permit movement of the actuator from the first actuator position to the second actuator position.

5. The electrical connector assembly of claim 1, further comprising a recessed area spaced from the actuator, and wherein in the second actuator position, the at least one pin is translatable relative to the body into the recessed area, the at least one pin includes a pin projection that is configured to retain the at least one pin in the recessed area when the actuator returns to the first actuator position.

6. The electrical connector assembly of claim 1, further comprising a spring connected to the actuator and configured to bias the actuator toward the first actuator position.

7. The electrical connector assembly of claim 1, wherein the at least one projection includes a cutout configured to accommodate a conductor in the second actuator position.

8. An electrical contact device of an electrical connector assembly, the electrical contact device comprising:
a first portion;
a second portion movable relative to the first portion in a first direction and in a second direction;
an actuator movable between a first actuator position and a second actuator position, wherein, when the actuator is in the first actuator position, the actuator is configured to permit movement in the first direction but inhibit movement in the second direction and, when the actuator is in the second actuator position, the second portion is configured to permit movement in the second direction.

9. The electrical contact device of claim 8, wherein the actuator includes,
a body extending along the actuator axis, and
at least one projection extending from the body in a first direction away from the actuator axis;
wherein, in the first actuator position, the at least one projection is configured to support the second portion and limit movement of the second portion in the second direction; and
wherein, in the second actuator position, the at least one projection is configured to translate and permit movement of the first portion in the second direction.

10. The electrical contact device of claim 8, further comprising a spring connected to the actuator and configured to bias the actuator toward the first actuator position.

11. The electrical contact device of claim 8, wherein the actuator includes a cutout configured to accommodate a conductor in the second actuator position.

12. The electrical contact device of claim 8, wherein in the second actuator position, the second portion is movable relative to the first portion between an electrically disconnected position and an electrically connected position where the first portion is electrically connected to the second portion.

13. The electrical contact device of claim 8, further comprising at least one elongated pin oriented parallel to the second direction, the at least one pin including an end, wherein when the actuator is in the second actuator position, the actuator engages the end of the at least one pin to secure the second portion against movement away from the first portion.

14. The electrical contact device of claim 8, wherein the second portion is biased away from the first portion in the second direction, wherein the actuator is movable between the first position and the second position in the second direction transverse to the first direction.

15. The electrical contact device of claim 8, wherein the first direction is a rotational direction about a device axis extending between the first portion and second portion, and the second rotational direction is a translational direction along the device axis.

16. The electrical contact device of claim 15, wherein the second portion is biased away from the first portion along the second direction.

17. The electrical contact device of claim 8, wherein the second portion is rotatable in the first direction between a first rotatable position and a second rotatable position, the electrical contact device further comprising at least one elongated pin oriented parallel to the second direction, the at least one pin including an end, wherein, when the second portion is in the first rotational position and the actuator is in the first actuator position, the end abuts the actuator to inhibit movement of the second portion to the retracted position, and when the second portion is in the second rotational position, the end is offset from the actuator to permit movement of the second actuator portion to a retracted position where an electrical connection is formed between the first portion and the second portion.

18. The electrical contact device of claim 17, wherein when the second portion is in the first rotational position and the actuator is in the first actuator position, the at least one elongated pin is positioned adjacent to a flange of the actuator and limits movement of the actuator from the first actuator position to the second actuator position.

19. The electrical contact device of claim 8, wherein
in the first actuator position, the at least one projection is configured to support at least one pin of the first portion in the first device position and limit movement of the second portion in the second direction; and
in the second actuator position, the at least one projection is configured to be spaced apart from the at least one pin in the second device position and permit movement of the second portion in the second direction.

20. The electrical contact device of claim 19, further comprising a recessed area spaced from the actuator, and wherein in the second actuator position, the at least one pin is translatable relative to the body into the recessed area, the at least one pin includes a pin projection that is configured to retain the at least one pin in the recessed area when the actuator returns to the first actuator position.

* * * * *